United States Patent
Pankow et al.

[11] Patent Number: 5,166,689
[45] Date of Patent: Nov. 24, 1992

[54] AZIMUTH CORRECTION FOR RADAR ANTENNA ROLL AND PITCH

[75] Inventors: Richard J. Pankow, Easton; Leonard T. LaPinta, Shelton, both of Conn.

[73] Assignee: United Technologies Corporation, Hartford, Conn.

[21] Appl. No.: 797,653

[22] Filed: Nov. 25, 1991

[51] Int. Cl.$^5$ .............................. G01S 13/66
[52] U.S. Cl. ...................... 342/77; 342/62; 342/63
[58] Field of Search ............ 342/77, 62, 63, 161, 342/195

[56] References Cited

U.S. PATENT DOCUMENTS

| | | | |
|---|---|---|---|
| 4,758,840 | 7/1988 | Dardenne et al. | 342/77 X |
| 4,806,934 | 2/1989 | Magoon | 342/103 |
| 4,837,576 | 6/1989 | Schwarz | 342/77 |
| 4,855,932 | 8/1989 | Cangiani et al. | 342/77 X |
| 4,975,705 | 12/1990 | Gellekink et al. | 342/77 X |

Primary Examiner—John B. Sotomayor
Attorney, Agent, or Firm—Michael Grillo

[57] ABSTRACT

A vehicle mounted radar system has an antenna (12) which rotates about a reference axis (19). During angular movement of the antenna with respect to the reference axis, a radar indicated target azimuth ($\phi'$) is modified to provide a corrected target azimuth ($\phi$) which is substantially indicative of the actual or true target azimuth. A tracking system (25) uses a predicted radar indicated target position ($P_{n+1}(x,y)$) for target tracking and correlation. The tracking system uses a smoothed target position ($STP(x,y)$), indicative of actual target position, for providing a visual display (39) of target track.

13 Claims, 4 Drawing Sheets

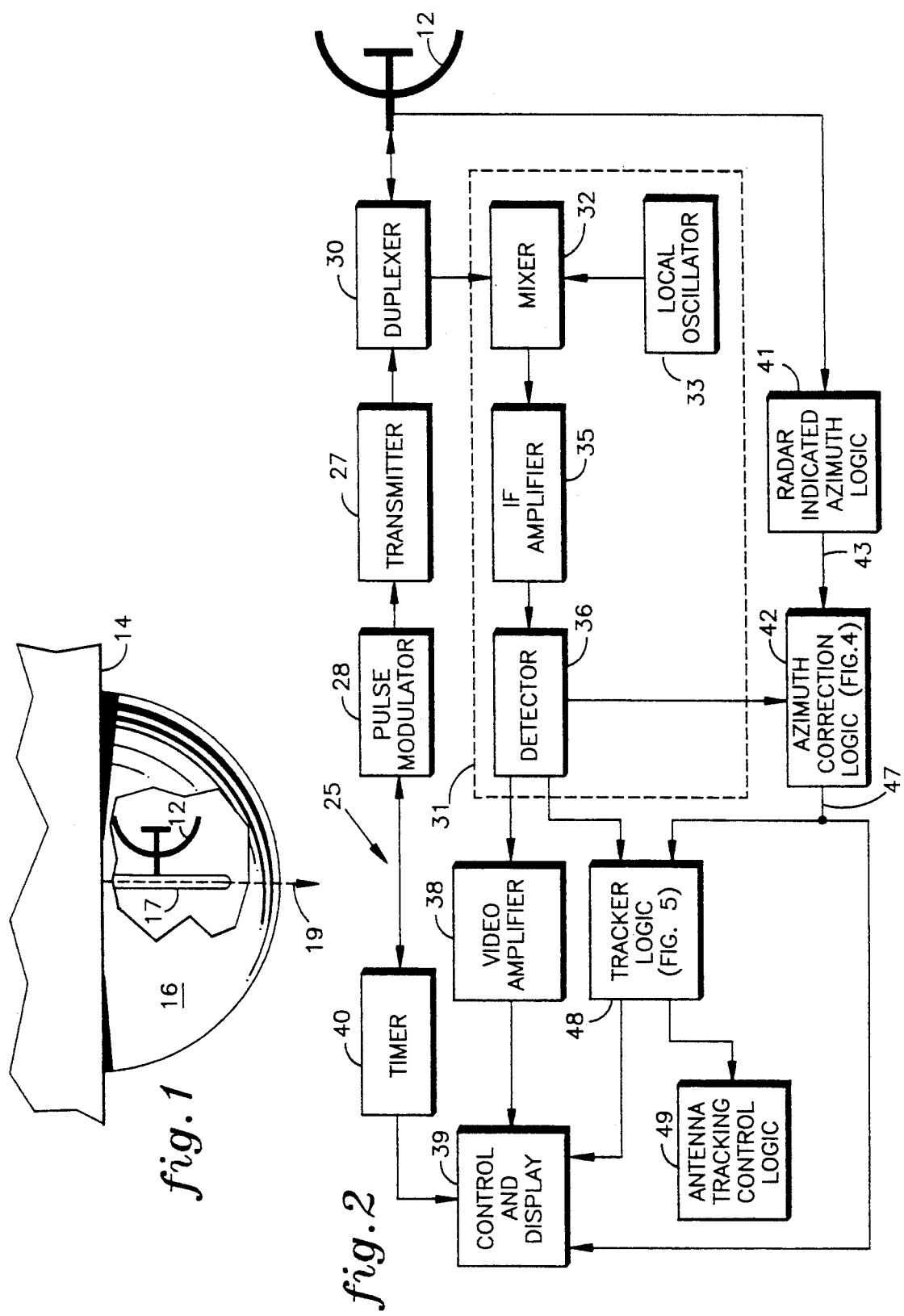

AZIMUTH CORRECTION FOR RADAR ANTENNA ROLL AND PITCH

TECHNICAL FIELD

The present invention relates to radar systems and more particularly to improved accuracy in target azimuth information during roll and/or pitch of a radar system antenna with respect to a reference.

BACKGROUND OF THE INVENTION

Radar systems are typically provided with a mechanical stabilization system for controlling the angular position of the radar system antenna to thereby maintain a constant reference frame for the antenna with respect to a reference axis or plane, e.g., ground. Such mechanical stabilization is usually accomplished using servomechanisms, e.g., gimbal and drive systems. There are three types of vehicle motion that can affect the angular position of the radar antenna: roll, pitch and yaw. Roll is the side-to-side angular motion about a longitudinal, i.e., fore and aft, axis of the vehicle. Pitch is the alternating motion about an axis perpendicular to the longitudinal axis of the vehicle. Yaw is the motion of the vehicle about the vehicle's vertical axis. Position or rate gyros are typically used to sense vehicle pitch and roll, and issue position signals directly to the stabilization system to maintain the desired antenna reference.

A problem with using gimbal and drive systems for mechanical antenna stabilization is that they add significant weight to the radar system, which is of particular concern in radars intended for use on aircraft. Additionally, because of complexities associated with stabilization systems, they are prone to frequent repair and maintenance. Another problem is that servomechanisms required for roll and pitch stabilization increase the overall size of an antenna assembly with the result that within a given installation space, the area for the radiating portion of the antenna, and consequently the antenna gain and resolution, must be reduced.

A radar antenna that is rotational only about a vertical or yaw axis and not provided with roll and pitch stabilization, i.e., having a fixed platform, is referred to as being "strapped down". A strapped down antenna eliminates weight penalties and complexities associated with mechanical stabilization systems, and also reduces the space requirement for a given antenna. However, any roll and/or pitch experienced by a vehicle carrying the antenna is translated directly to the antenna. Movement of the antenna in roll and pitch may look to the radar system like movement of the target, and therefore, fixed platform antennas are incapable of providing accurate target position information during roll and/or pitch of the antenna, thereby preventing the radar tracking system from maintaining target acquisition and correlation accuracy during antenna roll and/or pitch.

For example, if a strapped down radar is mounted on an aircraft which is located at an altitude of 1,000 feet, and is tracking an object 10 nautical miles away, a target bearing 45° relative to the aircraft will have a radar indicated azimuth of 45° relative during level flight. However, if the aircraft is in a roll angle of 10°, and therefore the radar antenna is at a 10° roll angle with respect to the reference axis, the indicated azimuth will be 44.4° relative. Similarly, if the aircraft is at a 10° pitch angle, the indicated azimuth will be 45.6° relative. The difference between the radar indicated azimuth and the actual azimuth increases with increased roll angle and pitch angle so that, for example, at a roll angle of 25°, the indicated azimuth will be 41.9° for a target with an actual azimuth of 45° relative.

The azimuth error suffered by radars which are not roll and pitch stabilized manifests itself as a "blurred" or "smeared" representation of the target on a radar display. Additionally, when roll or pitch movement of the radar antenna is rapid or of a large magnitude, the target may "jump" on the display. The azimuth error will also result in errors in the indicated target track position and velocity as provided by a radar tracking system.

DISCLOSURE OF INVENTION

Objects of the present invention include provision of a radar system which provides accurate target azimuth information during roll and/or pitch of the radar system antenna with respect to a reference.

According to the present invention, a radar indicated target azimuth is modified during angular movement of an antenna with respect to a reference axis to provide a corrected target azimuth which is substantially indicative of the actual or true target azimuth.

In further accord with the present invention, an azimuth error signal indicative of the difference between radar indicated target azimuth and corrected target azimuth is utilized by a radar tracking system to provide corrected target track information, indicative of the actual target track, to the radar system control and display, wherein changes in target position indicated by the radar system control and display are indicative of true target motion.

In still further accord with the present invention, the azimuth error signal is utilized by the radar tracking system to provide a predicted radar indicated target azimuth to maintain target tracking during angular movement of the antenna with respect to the reference axis.

In a radar system having an antenna which is not roll or pitch stabilized, the present invention corrects for errors in the radar indicated target azimuth which occur during roll and/or pitch of the antenna with respect to a reference. The present invention may also be utilized in a radar system having roll and pitch stabilization to correct for errors in the radar indicated target azimuth which may occur due to insufficient response of the stabilization system to roll and pitch of the radar antenna. Additionally, the azimuth correction may be utilized by a radar tracking system to maintain target track during angular movement of the antenna with respect to the reference axis. Therefore, changes in the indicated target position, e.g., the target position as indicated on a display unit, are indicative of true target motion and not changes in the angular position of the radar antenna with respect to the reference axis.

The invention may be implemented in a variety of ways including microprocessor software operating upon digital signals, or other alternative methods obvious to one skilled in the art, including, but not limited to, combinations of digital hardware, analog circuitry, etc. The invention is easily implemented using apparatus and techniques which are well known within the skill of the art in light of the specific teachings with respect thereto which follow hereinafter.

Other objects, features and advantage of the present invention will become more apparent in light of the following detailed description of exemplary embodi-

BRIEF DESCRIPTION OF DRAWINGS

FIG. 1 is a perspective view, partially broken away, of a radar antenna, which is not roll or pitch stabilized, mounted to the bottom of an aircraft;

FIG. 2 is a simplified schematic block diagram of a radar system employing target azimuth correction in accordance with the present invention;

BEST MODE FOR CARRYING OUT THE INVENTION

Figure 3:
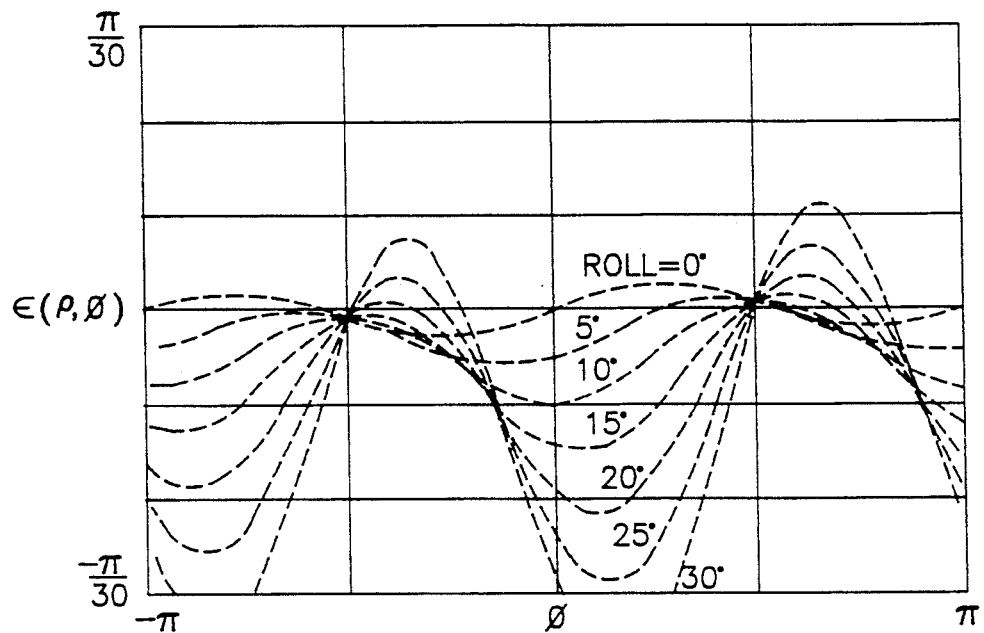
FIG. 3 is a graphical representation of radar indicated target azimuth error ($\epsilon$) with respect to true target azimuth for various radar antenna roll angles.

The present invention is particularly well suited for use in a radar system to correct for errors in radar indicated target azimuth caused by angular movement of a radar system antenna with respect to a reference axis. Referring to FIG. 1, a radar antenna 12 is mounted on the underside of a vehicle 14, e.g., an aircraft, and is covered by a protective shield or dome 16 to protect the antenna from damage. The antenna 12 is mounted for rotation on an axis or shaft 17 about an axis 19. The antenna of FIG. 1 is of the type which is particularly useful for surface searching and tracking of surface targets. For purposes of describing the present invention, the antenna of FIG. 1 is illustrated as being "strapped down" to the aircraft frame 14 with the result that any roll or pitch of the aircraft is transmitted to the antenna. However, the invention will work equally well with an antenna having servomechanisms which attempts to maintain the angular position of the antenna with respect to the reference axis 19.

Referring to FIG. 2, a simplified radar system 25 comprises a transmitter 27, e.g., an RF oscillator, that is pulsed, i.e. turned on and off, by a pulse modulator 28. The waveform generated by the transmitter 27 is provided via a duplexer 30 to the antenna 12, where it is radiated into space. The antenna is used for both transmitting and receiving. A receiver section 31 of the system must be protected from damage caused by the high power of the transmitter, and therefore, the duplexer 30 is provided to both protect the receiver from the high power transmitter signal and to channel the return echo signal to the receiver section 31.

The received signal is provided from the duplexer 30 to a mixer 32 which uses a local oscillator 33 to convert the received RF signal to an intermediate frequency (IF) signal. The IF signal is provided via an IF amplifier 35 to a detector 36 which extracts the pulse modulation from the IF signal. The output of the detector 36 is amplified by a video amplifier 38 to a level where it can be properly displayed on a control and display unit (CDU) 39, e.g., a cathode-ray tube (CRT) display. A timer 40 may be provided to supply timing signals to the display to provide a zero reference range.

All of the apparatus described thus far is simply exemplary of that which is well known in the art.

In accordance with the present invention, angle information is obtained from the pointing direction of the antenna 12 as indicated by a radar indicated azimuth logic portion 41 of the system 25. The angle information may be provided in any suitable way known in the art for converting mechanical radar antenna position information into a corresponding digital or analog signal, e.g., position sensors. Thereafter, the indicated angle is corrected in an azimuth correction logic portion 42 of the system as described in greater detail hereinafter with respect to FIG. 4. Typically, the display is intensity-modulated wherein the amplitude of the receiver output determines the corresponding intensity of a target indicated on the display. The angular position of the target is determined as described hereinabove with respect to the corrected antenna position provided by the azimuth correction logic portion 42 of the system.

During level flight of the aircraft, the radar indicated target azimuth will be equal to the true target azimuth, and no azimuth correction is required. However, as described hereinbefore, during angular movement of the antenna 12 with respect to the reference axis 19, the radar indicated target azimuth may be different from the true target azimuth. The radar indicated target azimuth ($\phi'$) is related to the true target azimuth ($\phi$) as given by the following relationships:

$$\tan\phi' = \frac{-\cos\phi\sin\mu\sin\mu + \sin\phi\cos\rho - (h/R)\sin\rho\cos\mu}{\cos\phi\cos\mu - (h/R)\sin\mu} = g(\phi) \quad \text{(eq. 1)}$$

$$\phi' = f(\phi) = \arctan[g(\phi)] \quad \text{(eq. 2)}$$

where h is the aircraft altitude, R is the plan range to the target, $\mu$ is the aircraft pitch angle, and $\rho$ is the aircraft roll angle. Therefore, during roll and/or pitch of the radar antenna with respect to the reference axis 19, an azimuth error ($\epsilon$) is generated which is the difference between the radar indicated target azimuth and the true target azimuth as given by the following relationship:

$$\epsilon = \phi' - \phi \quad \text{(eq. 3)}$$

The relationships of equations 1, 2 and 3 are graphically illustrated in FIG. 3. In the example shown in FIG. 3, the radar is mounted on an aircraft operating at an altitude of 1000 feet and tracking a target 10 nautical miles away. The aircraft is at a 10° pitch angle, and the azimuth error with respect to true target azimuth (relative to the aircraft heading) is shown for various aircraft roll angles at increments of 5° between 0° and 30° roll angle.

Solving equations 1 and 2 in terms of true target azimuth ($\phi$) results in a complex and high order equation. However, two observations may be utilized to simplify the relationships of equations 1 and 2. First, the true target azimuth and the indicated target azimuth are only a few degrees apart for normal values of roll and pitch, i.e.,:

$$\phi' \approx \phi \quad \text{(eq. 4)}$$

Second, because the error ($\epsilon$) is small and well behaved:

$$d\phi'/d\phi = df(\phi)/d\phi \approx 1 \quad \text{(eq. 5)}$$

Substituting the radar indicated target azimuth for the true target azimuth in equation 2 results in the following relationship:

$$f(\phi') = f(\phi + \epsilon) \qquad \text{(eq. 6)}$$

As is well known, equation 6 may be approximated by a first order Taylor series which is simplified by the assumption of equation 5:

$$f(\phi') \approx f(\phi) + \epsilon[df(\phi)/d\phi] \approx f(\phi) + \epsilon \qquad \text{(eq. 7)}$$

Therefore, the true target azimuth may be closely approximated by the following relationship:

$$\phi = 2\phi' - f(\phi') \qquad \text{(eq. 8)}$$

Figure 4:
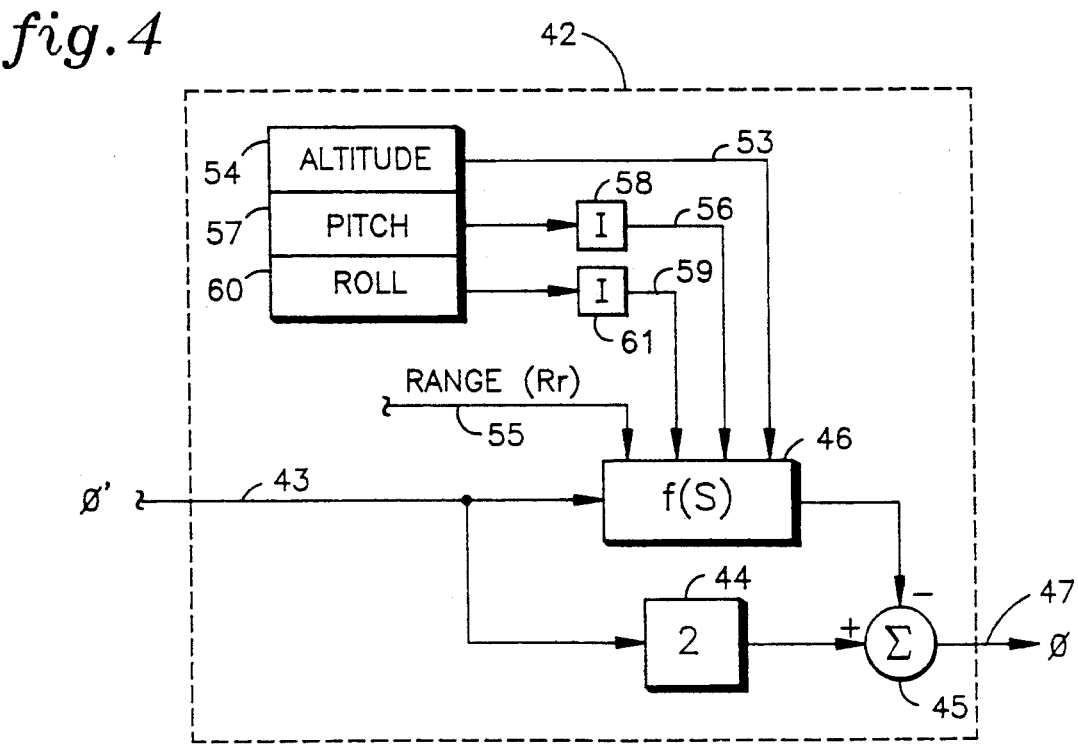
FIG. 4 is a simplified schematic block diagram of a general embodiment of target azimuth correction for use in the system of FIG. 2.

The relationship of equation 8 can be implemented in the azimuth correction logic portion 42 of the radar system of FIG. 2 using the control system of FIG. 4. Referring to FIG. 4, the radar indicated target azimuth is provided on a line 43 to a multiplier 44 which multiples the indicated target azimuth by 2. The output of the multiplier 44 is provided to a summing junction 45. The indicated target azimuth is also provided on the line 43 to a function generator 46. The other inputs to the function generator 46 include an altitude signal on a line 53 provided by an altitude sensor 54, e.g., a radar or laser altimeter, a range signal (Rr) on a line 55 provided by the radar system, a pitch angle signal on a line 56 as determined from the output of a pitch rate gyro 57 applied to an integrator 58, and a roll angle signal on a line 59 as determined from the output of a roll rate gyro 60 applied to an integrator 61. The function generator 46 performs the calculation corresponding to the relationship of equation 2, the result of which is also provided to the summing junction 45. The output of the summing junction is the corrected target azimuth on a line 47, i.e., the difference between the output of the multiplier 44 and the function generator 46, and is indicative of the true target azimuth.

Figure 5:
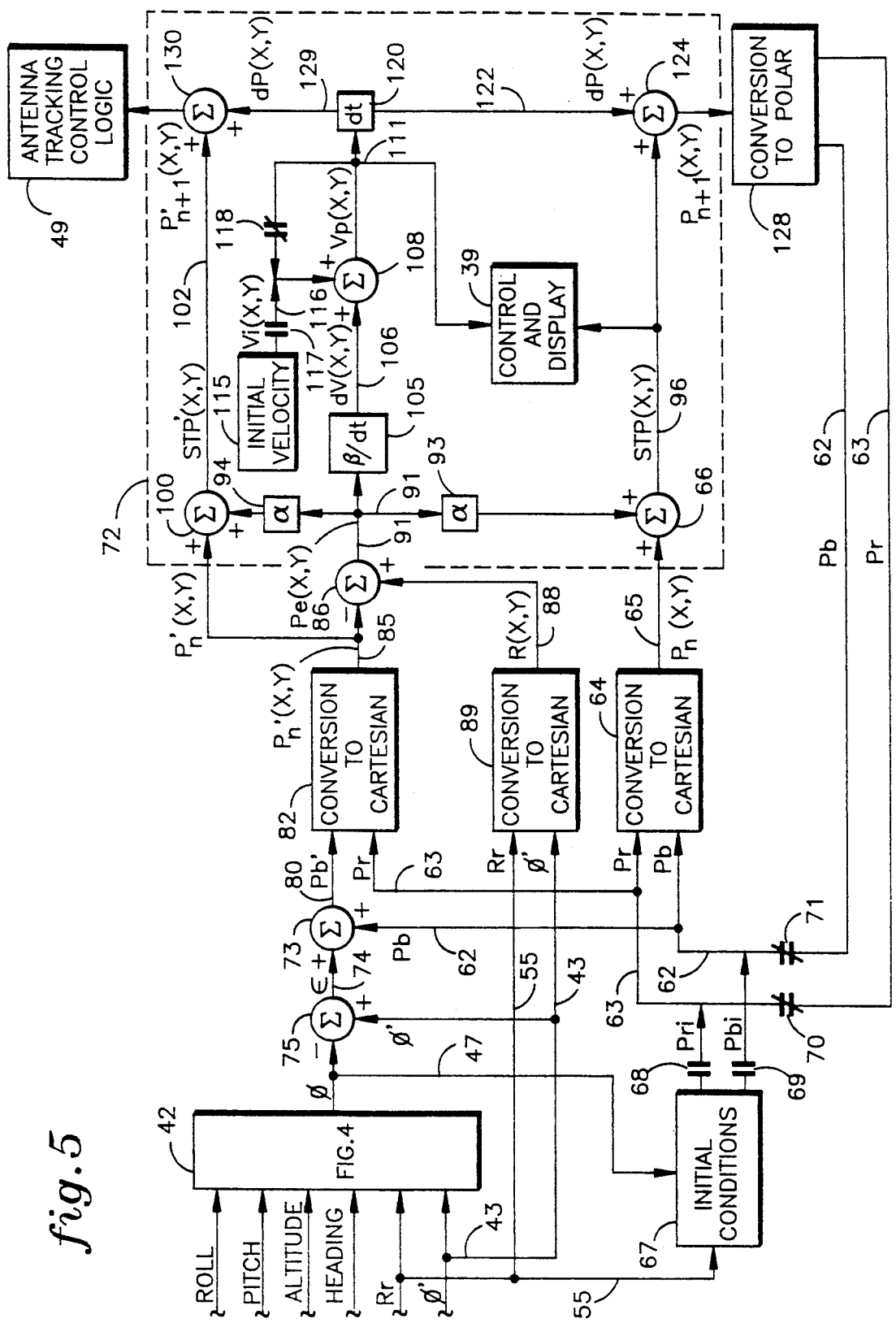
FIGS. 5a and 5b are a simplified schematic block diagram of a radar tracking system utilizing target azimuth correction of the present invention.

The radar system of FIG. 2 may also be provided with a tracker logic portion 48 which provides target track information to the CDU 39, and provides a predicted target position to antenna tracking control logic 49 so that multiple targets may be independently identified and tracked based on predicted target track. Referring to FIGS. 5a and 5b, a simplified alpha-beta target tracking system is shown having azimuth correction of the present invention. When a target is initially designated for tracking, initial target conditions are established in an initial conditions portion 67 of the tracking system wherein an initial predicted target bearing signal (Pbi) is set equal to $\phi$, and an initial predicted target range signal (Pri) is set equal to the radar indicated target range (Rr). The initial predicted target bearing and range are only provided by the initial conditions portion 67 of the tracking system via normally open contacts 68,69 when a target is initially designated for tracking to thereby provide initial values for a predicted target bearing signal (Pb) and a predicted target range signal (Pr). Pb and Pr are thereafter provided via normally closed contacts 70,71 as described in greater detail hereinafter.

Pb and Pr are provided on lines 62 and 63 respectively to a conversion portion 64 of the tracker system and converted from polar coordinates to cartesian coordinates using apparatus and techniques which are well known within the skill of the art, to thereby provide a pair of predicted target position signals $P_n(x)$ and $P_n(y)$, which are shown as one signal $P_n(x,y)$ on a line 65 to a summing junction 66. For simplicity, all of the apparatus within the dashed line 72 is shown as singular, as for x or for y; however, each function is performed separately for x and for y. Hereinafter, it will be understood that signals shown as (x,y) actually represent two separate signal, one for x and another for y.

Pb is also provided on the line 62 to a summing junction 73. The other input to the summing junction 73 is an azimuth error signal ($\epsilon$) on a line 74. The azimuth error signal is provided on the line 74 from a summing junction 75 as the difference between $\phi'$ on the line 43 and $\phi$ on the line 47 as provided from the azimuth correction logic portion 42 of the radar system 25. The output of the summing junction 73 is a predicted radar indicated target bearing signal (Pb') on a line 80 which is provided to a conversion portion 82 of the tracker system. The other input to the conversion portion 82 is Pr on the line 63. The output of the conversion portion 82 is a predicted radar indicated target position signal $P'_n(x,y)$ on a line 85. $P'_n(x,y)$ on the line 85 is the predicted target position as would be indicated by the radar antenna with no azimuth correction for roll and pitch of the antenna, while $P_n(x,y)$ on the line 65 is the predicted target position based on the true or corrected target azimuth. If the target azimuth indicated by the radar antenna is equal to the true target azimuth, $\epsilon$ is equal to zero and $P'_n(x,y)$ is equal to $P_n(x,y)$. $P'_n(x,y)$ is provided on the line 85 to a summing junction 86. The other input to the summing junction 86 is a radar indicated target position signal R(x,y) on a line 88 which is provided by converting $\phi'$ and Rr from polar to cartesian coordinates in a conversion portion 89 of the tracking system.

The output of the summing junction 86 is a predicted position error signal Pe(x,y) on a line 91 which is indicative of the difference between R(x,y) and $P'_n(x,y)$. Pe(x,y) is applied to a pair of multipliers 93,94 which multiply the error signal by a first constant ($\alpha$). The output of one of the multipliers 93 is applied to the summing junction 66 where it is summed with $P_n(x,y)$ to provide a smoothed target position signal STP(x,y) on a line 96. STP(x,y) is a target position signal that is corrected for any errors identified by the tracker system, and represents the most accurate position signal for the tracked target. STP(x,y) is provided to the CDU 39 to provide the indicated position of the target being tracked on the CDU. The output of the other multiplier 94 is provided to a summing junction 100 where it is summed with $P'_n(x,y)$. The output of the summing junction 100 is a radar indicated smoothed target position signal STP'(x,y) on the line 102, and represents the predicted target azimuth as indicated by the radar antenna.

Pe(x,y) is also applied to a multiplier 105 which multiplies the error signal by a second constant $\beta/\delta t$, the output of which is a change in velocity signal $\delta V(x,y)$ on a line 106. $\beta$ is a constant, and $\delta t$ is indicative of the radar antenna scan rate, i.e., the time it takes the antenna to make a complete revolution. Therefore, $\delta V(x,y)$ is indicative of the incremental change in target velocity during the time period $\delta t$ associated with the error in predicted target position Pe(x,y). $\delta V(x,y)$ is applied to a summing junction 108 where it is summed with a predicted velocity signal Vp(x,y) on a line 111. Initially, the predicted velocity signal is supplied by an initial velocity portion 115 of the tracking system which supplies an initial velocity signal Vi(x,y) on a line 116 via normally open contacts 117. Vi(x,y) may be a fixed velocity based on the type of target being tracked or may be an instantaneous velocity calculation based on the the change in position of the target during a single scan period. Vi(x,y) is only provided when a target is initially designated for tracking, and thereafter, Vp(x,y) is provided in a feedback loop to the summing junction 108 via normally closed contacts 118.

The output of the summing junction 108 is Vp(x,y) on the line 111, which thereafter is provided to the CDU as an indication of the target velocity. As is known in the art, the target velocity may be displayed on the same display as the target or on a separate display. Vp(x,y) is also applied to a multiplier 120 which multiplies Vp(x,y) by the scan period δt. The output of the multiplier is a change in predicted position signal δP(x,y) which is indicative of the change in target position during the scan period δt for a target moving at a velocity equal to Vp(x,y). δP(x,y) is provided on a line 122 to a summing junction 124 where it is summed with STP(x,y) on the line 96. The output of the summing junction 124 is a predicted target position signal $P_{n+1}(x,y)$ indicative of the predicted target azimuth and range, corrected for roll and pitch in accordance with the present invention, where the tracker expects to display the target during the next time that the target is scanned by the radar antenna, i.e., the predicted true target azimuth after the time period δt. $P_{n+1}(x,y)$ is provided to a conversion portion 128 where it is converted from cartesian coordinates to polar coordinates to thereby provide Pb and Pr on lines 62 and 63 respectively. Thereafter, Pb and Pr are provided via the normally closed contacts 70,71.

δP(x,y) is also provided on a line 129 to a summing junction 130 where it is summed with STP'(x,y) on the line 102. The output of the summing junction 130 is the predicted radar indicated target position signal $P'_{n+1}(x,y)$ indicative of the predicted radar indicated target azimuth where the tracker expects to locate the target during the next time that the target is scanned by the radar antenna, i.e., the predicted radar indicated target azimuth after the time period δt. $P'_{n+1}(x,y)$ is provided to the antenna tracking control logic 49 where it is used to create a "window" of azimuth and range where the target is expected to be located during the next antenna sweep of the target. The window may be of fixed parameters based on predicted target position and velocity, or it may become smaller as target positioning information becomes more accurate with further sweeps of the radar antenna. The information is particularly useful for target correlation purposes when the tracker is tracking multiple targets.

The tracking system of FIGS. 5a and 5b including target azimuth correction of FIG. 4, may be embodied in digital integrated circuitry which implements the system described hereinbefore. However, the tracking system may also be of the type employing a known microprocessor (UPROC) for executing an algorithmic subroutine of FIG. 6, as described hereinafter, which implements the azimuth correction system and tracking system of FIGS. 4, 5a and 5b.

Figure 6:
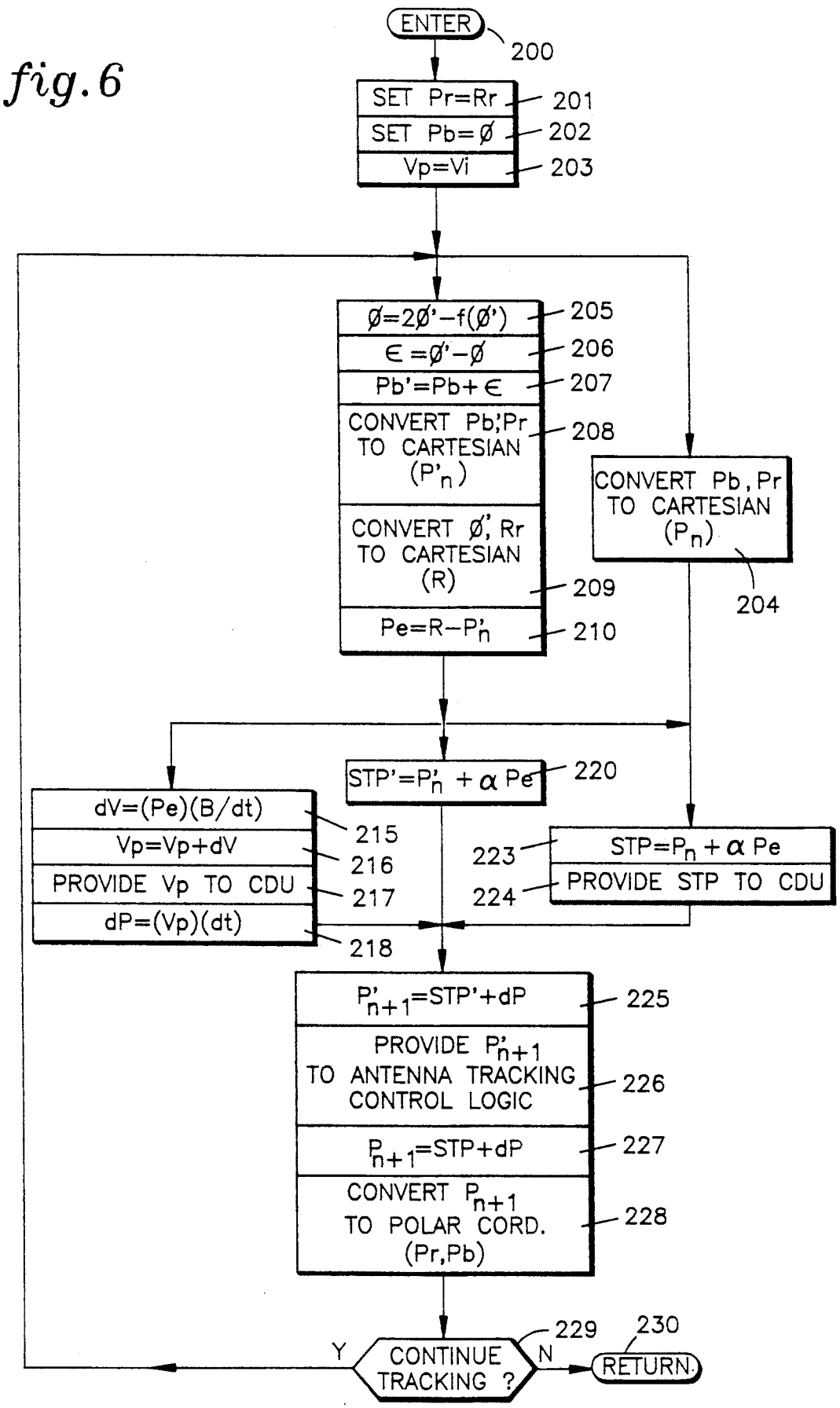
FIG. 6 is a simplified logic flow diagram of a routine for providing target tracking utilizing target azimuth correction in accordance with the present invention in a digital tracking system.

Referring to FIG. 6, the subroutine is entered in a step 200, and the tracking system initial conditions are established in steps 201-203 wherein Pr is set equal to Rr, Pb is set equal to φ and Vp(x,y) is set equal to Vi(x,y). Next Pb and Pr are converted from polar coordinates to cartesian coordinates in a step 204 to provide $P_n(x,y)$. While step 204 is being performed, steps 205-210 are consecutively performed wherein φ is determined using equation 8, ε and Pb' are calculated, Pb' and Pr are converted from polar coordinates to cartesian coordinates to provide $P'_n(x,y)$, φ' and Rr are converted from polar coordinates to cartesian coordinates to provide R(x,y), and Pe(x,y) is calculated.

Next, three parallel series of steps are performed. In steps 215-218, δV(x,y) and Vp(x,y) are calculated, Vp is provided to the CDU, and δP(x,y) is calculated. In step 220, STP'(x,y) is calculated. In steps 223 and 224, STP(x,y) is calculated and thereafter provided to the CDU.

$P'_{n+1}(x,y)$ is calculated in the step 225 using STP'(x,y) and δP(x,y). Thereafter, $P'_{n+1}(x,y)$ is provided to the Antenna Tracking Control Logic in a step 226. $P_{n+1}(x,y)$ is calculated in the step 227 using STP(x,y) and δP(x,y). Thereafter, $P_{n+1}(x,y)$ is converted from cartesian coordinated to polar coordinates in a step 228 to provide Pr and Pb. Next, the UPROC checks if the target is still designated for tracking in a test 229. If the results of the test 229 are positive, the subroutine returns to the steps 204 and 205. However, if the results of the test 229 are negative, the subroutine returns in a step 230.

The azimuth correction of the present invention can be used to correct all azimuth information from the radar indicated azimuth logic 41 as described herein, or it my be used only for correcting azimuth information associated with targets designated for tracking. In the latter case, angle information associated with radar returns from land masses or targets not designated for tracking is supplied directly from the radar indicated azimuth logic to the CDU, and angle information associated with targets being tracked is first supplied to the azimuth correction logic prior to being supplied to the tracker logic.

Although the invention is shown as being an integral part of a radar system, it may be provided as an add-on to an existing radar system to provide corrected target azimuth information.

The azimuth correction of the invention may be implemented with a computer program change to the program of a radar system or tracker system which is implemented digitally by means of a computer, or the invention could be implemented with dedicated digital or analog hardware.

The invention is described as it may be utilized with a radar system having an antenna with a single degree of freedom; however, it may also be utilized with a system having an antenna which is stabilized in three degrees of freedom to correct for azimuth error caused by antenna roll or pitch beyond the limits of the stabilization system. In such a case, signals indicative of the angular movement of the antenna with respect to the reference axis would be provided to the azimuth correction logic of the present invention to correct the radar indicated azimuth. For example, when the roll angle of the vehicle exceeds the maximum roll angle that the stabilization system is mechanically able to compensate (maximum roll angle), a signal equal to vehicle roll angle less the maximum roll angle is indicative of antenna roll with respect to the reference axis. Although the invention is illustrated as being used with a radar antenna mounted on the underside of an aircraft, the invention will work equally as well for correcting azimuth error caused by roll and pitch of a radar antenna mounted on any type of vehicle or platform which is subject to movement which can be translated directly to the antenna.

Although the invention has been illustrated and described with respect to exemplary embodiments thereof, it should be understood by those skilled in the art that the foregoing and various other changes, omission and additions may be made therein and thereto, without departing form the spirit and scope of the present invention.

We claim:

1. A vehicle mounted radar system comprising:
   an antenna rotational about an antenna axis which extends generally perpendicular from the vehicle along a reference axis;
   receiver means connected to said antenna for receiving radar echoes from at least one target and for providing, in response to said radar echo range signals indicative of the range to the respective targets;
   means for providing radar indicated azimuth signals indicative of the pointing direction of said antenna with respect to the vehicle;
   antenna position indicating means for providing an antenna position signal indicative of the angular position of said antenna with respect to said reference axis;
   altitude indicating means for providing altitude signals indicative of the difference in altitude between the vehicle and the targets; and
   target azimuth correcting signal processing means for providing, in response to said range signals, said radar indicated azimuth signals, said antenna position signal and said altitude signals, corrected target azimuth signals indicative of the actual azimuth with respect to the vehicle of the respective targets corresponding to said range signals.

2. A vehicle mounted radar system according to claim 1 wherein said antenna position indicating means comprises:
   pitch angle means for providing a pitch angle signal indicative of the pitch angle of said antenna with respect to said reference axis; and
   roll angle means for providing a roll angle signal indicative of the roll angle of said antenna with respect to said reference axis;
   said target azimuth correcting signal processing means being responsive to said pitch angle signal and said roll angle signal for providing said corrected target azimuth signals.

3. A vehicle mounted radar system according to claim 1 further comprising display means responsive to said range signals and said corrected target azimuth signals for providing a visual display indicative of the position of the targets.

4. A vehicle mounted radar system according to claim 3 further comprising:
   tracking means, responsive to said radar indicated azimuth signals, said range signals and said corrected target azimuth signals, for providing:
   (a) predicted radar indicated target position signals indicative of predicted positions that targets being tracked will be located by said antenna after a scan period corresponding to the next time each target is scanned by said antenna,
   (b) smoothed target position signals indicative of the actual position of the targets being tracked, and
   (c) velocity signals indicative of the velocity of the targets being tracked; and
   antenna tracking logic means responsive to said predicted radar indicated target position signals for correlating targets being tracked;
   said smoothed target position signal and said velocity signals being provided to said display means for providing a visual display of the position and velocity of targets being tracked.

5. An aircraft radar system comprising:
   an antenna rotational about a reference axis;
   receiver means connected to said antenna for receiving radar echoes from at least one target and for providing, in response to said radar echoes, range signals indicative of the range to the respective targets;
   means for providing radar indicated azimuth signals indicative of the pointing direction of said antenna with respect to the aircraft;
   antenna position indicating means for providing an antenna position signal indicative of the angular position of said antenna with respect to said reference axis;
   altimeter means for providing an altitude signal indicative of the aircraft altitude; and
   target azimuth correcting signal processing means for providing, in response to said range signals, said radar indicated azimuth signals, said antenna position signal and said altitude signal, corrected target azimuth signals indicative of the true azimuth with respect to the aircraft of the respective targets corresponding to said range signals.

6. An aircraft radar system according to claim 5 wherein said antenna position indicating means comprises:
   pitch angle means for providing a pitch angle signal indicative of the pitch angle of said antenna with respect to said reference axis; and
   roll angle means for providing a roll angle signal indicative of the roll angle of said antenna with respect to said reference axis;
   said target azimuth correcting signal processing means being responsive to said pitch angle signal and said roll angle signal for providing said corrected target azimuth signals.

7. An aircraft radar system according to claim 5 further comprising display means responsive to said range signals and said corrected target azimuth signals for providing a visual display indicative of the position of the targets.

8. An aircraft radar system according to claim 7 further comprising:
   tracking means, responsive to said radar indicated azimuth signal, said range signals and said corrected target azimuth signals, for providing:
   (a) predicted radar indicated target position signals indicative of predicted positions that the targets being tracked will be located by said antenna after a scan period corresponding to the next time each target is scanned by said antenna,
   (b) smoothed target position signals indicative of the actual position of the targets being tracked, and
   (c) velocity signals indicative of the velocity of the targets being tracked; and
   antenna tracking logic means responsive to said predicted radar indicated target position signals for correlating targets being tracked;

said smoothed target position signals and said velocity signals being provided to said display means for providing a visual display of the position and velocity of targets being tracked.

9. A method of correcting an azimuth signal provided by an aircraft mounted radar system during angular movement of a radar system antenna with respect to a reference axis, the method comprising the steps of:

receiving radar echoes from at least one target;

converting said radar echoes into range signals indicative of the ranges to the respective targets;

providing radar indicated azimuth signals indicative of the pointing direction of the antenna with respect to the aircraft, each one of said range signals having a corresponding radar indicated azimuth signal;

providing an antenna position signal indicative of the angular position of the antenna with respect to the reference axis;

providing an altitude signal indicative of the altitude of the aircraft; and correcting said radar indicated azimuth signals in response to said range signals, said antenna position signal and said altitude signal to provide corrected target azimuth signals indicative of the actual azimuth with respect to the aircraft of the respective targets corresponding to said range signals.

10. The method of claim 9 wherein said antenna position signal comprises a pitch angle component indicative of the pitch angle of the antenna with respect to the reference axis and a roll angle component indicative of the roll angle of the antenna with respect to the reference axis.

11. The method of claim 9 further comprising the step of providing a visual display of target position in response to corresponding range signals and corrected target azimuth signals.

12. The method of claim 9 further comprising the steps of:

providing, in response to said radar indicated azimuth signals and said range signals, predicted radar indicated target position signals indicative of predicted positions that targets will be located by the antenna after a scan period corresponding to the next time that each target is scanned by the antenna; and correlating targets being tracked using said predicted radar indicated target position signals.

13. The method of claim 12 further comprising the steps of:

providing in response to said range signals, said radar indicated azimuth signals and said corrected target azimuth signal, smoothed target position signals indicative of the actual position of targets being tracked;

providing velocity signal indicative of the velocity of targets being tracked; and providing a visual display of the position and velocity of targets being tracked in response to said smoothed target position signals and said velocity signals.

* * * * *